United States Patent [19]

Fox

[11] 4,423,306

[45] Dec. 27, 1983

[54] WELDING CABLE AND EQUIPMENT

[76] Inventor: Richard W. Fox, Circleville, Utah 84723

[21] Appl. No.: 400,595

[22] Filed: Jul. 22, 1982

Related U.S. Application Data

[63] Continuation of Ser. No. 207,949, Nov. 18, 1980, abandoned.

[51] Int. Cl.³ .............................................. B23K 9/32
[52] U.S. Cl. .......................... 219/137.9; 174/15 WF; 174/112; 174/115
[58] Field of Search ............... 219/137.9, 15 WF, 112, 219/115, 117 F

[56] References Cited

U.S. PATENT DOCUMENTS

| | | | |
|---|---|---|---|
| 2,581,472 | 1/1952 | Dudley | 174/117 F |
| 3,328,510 | 6/1967 | White | 174/115 X |
| 3,992,565 | 11/1976 | Gatfield | 174/15 WF |

FOREIGN PATENT DOCUMENTS 300826 11/1928 Australia ............................. 174/115

OTHER PUBLICATIONS

Roebling in Electrical Manufacturing, vol. 55, #1, 1/55, p. 49.

Primary Examiner—Elliot A. Goldberg
Attorney, Agent, or Firm—B. Deon Criddle

[57] ABSTRACT

Welding cable and equipment wherein welding cable is color-coded and comprises respective composite cables that individually have as components a power cable and, attached thereto, a control cable. Color coding may be provided by paint, dye or other means at cable areas remote from natural wear areas. Preferably at least one of the cable elements of the composite welding cable will be provided with a durable rubber or other sheath that can accommodate heavy wear areas and abrasive conditions. Welding equipment is provided such that a maze of composite welding cables can be individually identified and manipulated, used and routed accordingly.

1 Claim, 3 Drawing Figures

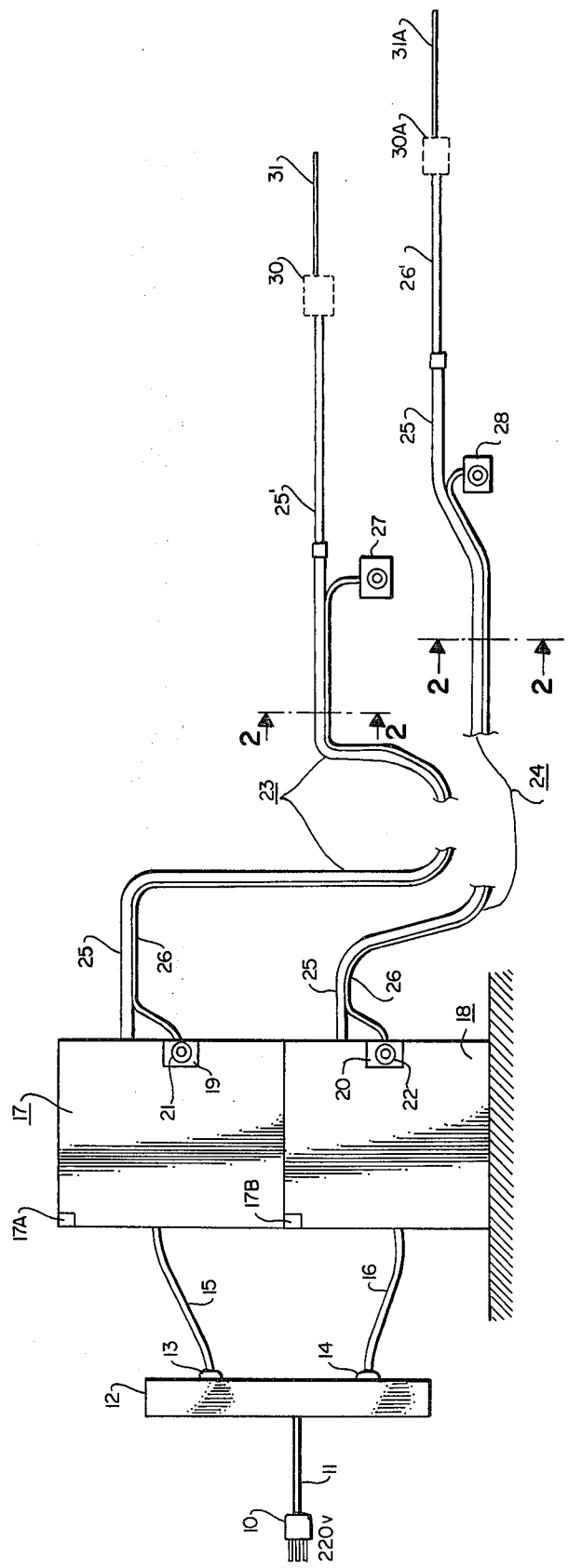
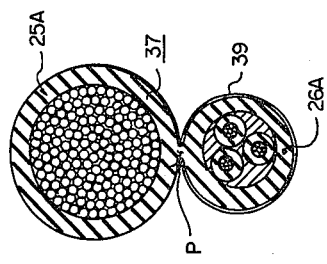
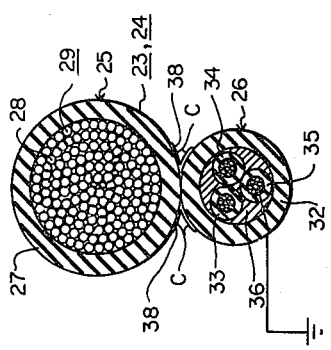

WELDING CABLE AND EQUIPMENT

This is a continuation of application Ser. No. 207,949, filed Nov. 18, 1980 now abandoned.

FIELD OF INVENTION

The present invention relates to welding cables and equipment and, more particularly, provides color-coded composite welding cables incorporating both a control cable for remote control units and also power cables powering welding end equipment. More particularly, the present invention provides color-coded welding cable constructed to perform both and control and welding functions, having cable ends that can be easily separated and independently used while still being easily recognized as coming from an identifiable combined cable, as well as being provided with color-coding indicia whereby the cables can be routed and followed through various mazes of wires, cables, etc.

DESCRIPTION OF PRIOR ART AND BACKGROUND OF INVENTION

In the past welding machines of various makes and manufacturers have been used, such incorporating or being adapted for both local and remote control and, of course, supplying power by virtue of power leads or cables that are specially constructed to deliver large quantities of power to heli-arc or rod welding equipment. Where several welders are working in the building being constructed, the mazes of welding wires and leads become appreciable in this extent, so much so that it is very difficult to trace a wire from one welding machine to its end equipment. This presents a number of difficulties to workmen, continuing or substitute, who must associate particular end equipment with a particular welding machine. The present invention solves this difficulty by color coding individual ones of the cables.

A second difficulty is presented in present day welding equipment since control cables routed from the welding machine to the remote control unit is a cable totally separate from the power cable. In the present invention this condition is corrected in that the control cable is made an integral part of the power cable. This is done by cementing the two cables together at the manufacturing point, vulcanizing the two cables together, or even forming a single insulative jacket which incorporates the respective cable elements. In a preferred form of the invention, one component cable of the composite welding cable is supplied an outer jacket that has long-wear characteristics. Heretofore, workmen have had to tape the two cables together for a particular welding machine, i.e., the control cable and the power cable. However, the tape wears out very fast when cables are being dragged along the floor or ground or other surface. Additionally, the taping does not provide for color coding as the art is presently practiced.

Certain U.S. patents are relevant to the invention, and these are as follows:

U.S. Pat. Nos. 1,548,204, 2,126,490, 2,175,749, 2,320,470, 3,020,335, 3,328,514, 3,663,359, 3,715,458, 4,077,849, and 4,128,736.

These patents pertain, in general, to welding equipment, color coding, and to wires joined together by individual jackets. None of these patents, however, are believed to teach either the concept of control and power cables being integrally joined, their ends being separable, or of providing conveniently long-lived color coding thereto. In certain non-analogous art such as non-electrical, gas conducting hoses, use of color-coded gas-conducting hoses has been recognized.

BRIEF DESCRIPTION OF THE PRESENT INVENTION

According to the invention one or several welding machines are provided a power source, end equipment such as flexible whips and welding rod or heli-arc end equipment, and also intermediate power and control cables that are integrally joined together to form a composite welding cable. Opposite ends of the composite cable are separable but are still identifiable as coming from the composite cable so that power-cable and control-cable ends may be respectively connected, as appropriate, to the welding machine. Remote split ends go to the remote control unit and also to the whip, respectively. Hence, the composite cable is formed of the control cable and the power cable, integrally joined together and provided with color coding, either in the form of a colored stripe appearing approximate the juncture of the two cables and extending into both cables and interior of the wear surfaces of the composite cable, or simply may comprise a common color coded jacket disposed about both of the cable components. Accordingly, different color coding for different welding cables makes it easy for one to trace the cables from a particular welding machine to particular end equipment.

OBJECTS

Accordingly, a principal object of the present invention is to provide new composite welding cable.

A further object is to provide appropriately color-coded welding cable.

A further object is to provide welding equipment wherein composite cables are color coded to provided for ease of separate identification along the lengths of such cables.

A further object is to provide welding equipment which has optimum facility for replacement of workers, use by same workers to identify rapidly end equipment with particular welding machines, as well as avoid ambiguities as may be caused through welding cable mazes.

BRIEF DESCRIPTION OF DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a side elevation, somewhat in schematic form, of welding equipment incorporating plural welding machines and associated cables and equipment constructed in accordance with the principles of the present invention.

FIG. 2 is an enlarged cross-section taken along the lines 2—2 in FIG. 1.

FIG. 3 is similar to FIG. 2, but illustrates alternate form of the composite welding cable.

BRIEF DESCRIPTION OF PREFERRED EMBODIMENTS

In FIG. 1 input power plug 10 is connected to cable 11 which feeds electrical bus 12. Plugs 13 and 14 have respective power input cables 15 and 16 which lead to respective welding machines 17 and 18. Each of the welding machines is provided with a local control unit 19 and 20, each being provided with control knob or wheel 21 and 22.

Composite welding cables 23 and 24 are provided, these respectively connecting whips 25', 26' and remote control units 27, 28 to welding machines 17 and 18 as indicated.

FIG. 2 illustrates in cross section a representative composite welding cable 23, 24. Thus, for example, composite welding cable 23 includes a power cable 25 and a control cable 26. Power cable 25 comprises an outer insulative jacket 27 made of rubber or neoprene, for example, which interiorly encloses a series of non-insulated core wires 28 forming in their composite a power conductive core 29. Core 29, hence, supplies sufficient power to actuate the end welding equipment such as end unit 30 supplied with welding rod 31.

The second component of the composite welding cable 23 comprises the control cable 26 as before mentioned, the same including an insulative outer sheathing 32 interiorly encasing insulated control wires 33, 34 and also ground wire 35. Insulative packing at 36 may be provided to fill up the spaces between the encased wires 33-35. Wire 35, as indicated, may be a ground wire. Generally speaking, control cable 26 will contain a three-wire system as indicated; however, all other types of control circuits may be incorporated in the welding machine, as per standard practice, in which event, the control cable can comprise simply a two-wire instead of a three-wire system.

Of importance is the fact that control cable 26 will be physically joined or bonded to power cable 25, preferably in the manufacturing process. This can be performed by vulcanization, by cement, or even by an integral composite insulative jacket as at 37 in FIG. 3. In the structure of FIG. 2, where the outer surfaces of insulative jackets 28 and 32 are similarly colored, then a paint or other colored layer may be supplied as color coding, see color-coding layer 38 in FIG. 2, whereby the composite welding cable can be color coded to a particular welding machine. It is to be noted that the extremities of the color coding layers 38 at opposite sides of the composite cable will have extremities that are foreshortened so that these will not extend to the outer peripheries of the power and control cables 25, 26, whereby to rub against the floor or other structures. This will insure continuity and long life of the color coding used by the cable, and this especially is desirous where paint or type of color coding forms the layers 38 in FIG. 2.

In other types of constructions, it will be perhaps preferred to include an actual color coding jacket as at 39 about at least one of the cables 25A, corresponding to cable 25 in FIG. 2, or cable 26A, corresponding to cable 26 in FIG. 2. Thus, color coding jacket 39, where used, may proceed around cable 26A and, where such jacket comprises rubber or neoprene, for example, can be easily vulcanized, cemented or otherwise secured in place and provide a very rough coating for the cable so that the color coding provided will be of long life. The color coding selected, whether by the structure of FIG. 2 or by the structure of FIG. 3, for the respective cables 23, 24, will be different. Thus, the color coding for cable 23 can be green in color, whereas the color coding for cable 24, however provided as per FIG. 2 or FIG. 3, by way of example, can be red. Accordingly, the different users of the respective welding machines 17 and 18 will find it very easy to trace their respective composite welding cables through the maze of welding cables that may exist on the floor or other structure of any building be constructed, by way of example. The welding machines themselves may be color coded by patches 17A and 17B which correspond in color to the colors of the respective composite welding cables supplied the same.

Notwithstanding the fact that the respective power cables will be attached or integral with the respective control cables, see 25, 26 in FIG. 2, by way of example, it is important that these cables be readily separable with the color coding of the composite cable being common to color coding then on each separated cable so that the control cable can be re-routed to the local or remote control units, as the case may be, and also so that the power cable can be provided with suitable end equipment for end connection to whips 25', 26', and also to the welding machines at the respective conventional power connections relative to welding machines 17 and 18 while still being identifiable. End unit 30A and rod 31A will be supplied the end of whip 25'.

End units 30 and 30A are conventional in form, generally taking the form of a hand-held unit provided with tongs of a spring loaded variety having ends which are adapted to receive welding rods of any one of a number of diameter sizes. All this is conventional.

In operation a welder will have at his access a remote control unit 27, for example, and also be provided with the flexible whip conductor 25' supplied with end unit 30 suitable for hand actuation. The rod 31 will be provided. The user can simply turn on the equipment and also control the amount of power supplied the rod by suitable actuation of the remote control unit 27, of any standard manufacture. Accordingly, he can control the operation of the welding equipment, or heli-arc welding equipment supplied the whip, by means of local control as at 27.

Should that welder be dismissed or be absent from the job and another party come be asked to operate a particular welding machine 17, for example, he can easily go through the maze of wires as may exist in the building, by following the color coding to the particular welding machine that he will be using, and easily reach the end equipment that welding machine's composite welding cable. This is because the cable can be easily traced through the maze of cables that will exist.

Again, while it is preferred to have a color coding jacket that is vulcanized or otherwise adhered to a composite insulative jacket as at 37 in FIG. 3, the paint or other technique can be used as in FIG. 2, provided the paint extremities do not extend to wear areas of the power and control cables at their outer surfaces which might engage the floor or other machinery. Notwithstanding this latter possibility, it is preferred that a rubber sheath or other long-wearing sheath as at 39 in FIG. 3 be employed.

What is provided, therefore, is welding cable and, indeed, welding equipment whereby one or more users can easily trace the welding cables back to the machines that they will be operating, thus easily differentiating their particular composite welding cables from others as may exist. The respective welding cables will, of course, have their own individual respective colors.

It is to be noted that jacket 37 in FIG. 3 includes a small-width intermediate portion P which is slit to separate the power cable from the control cable at opposite ends of the composite welding cable. For color coding as per FIG. 2, crevices C are provided at opposite sides of the composite welding cable, such crevices receiving color-coding surface layers 38.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Welding equipment comprising
   a control cable comprising a plurality of individually insulated control wires bundled together and having a common insulating jacket therearound;
   a power cable comprising a power conductive core made of bundled non-insulated core wires surrounded by the common insulating jacket, said power cable having a larger diameter than the control cable whereby an elongate, recessed medial portion is formed in the common insulating jacket at opposite sides of the welding cable between the control cable and the power cable;
   color coding means permanently affixed to the control cable and the power cable, said color coding extending into the recessed medial portion formed between the control cable and the power cable at opposite sides of the welding cable to be protected during dragging of the welding cable, whereby upon splitting of a portion of the control cable from the power cable the color coding common to the welding cable will split to become part of each split cable and will be easily viewed as continuing from each opposite side of the welding cable as part of such split apart control and power cables; and
   additional color coding means corresponding in color to the color coding means and including means for attachment to a welding machine.

* * * * *